United States Patent [19]
Rowden et al.

[11] Patent Number: 5,598,310
[45] Date of Patent: Jan. 28, 1997

[54] MAGNETIC HEAD-TO-MEDIA BACKER ASSEMBLY

[75] Inventors: David L. Rowden; Dale W. Ryan; Thomas C. Merle, all of Rochester, N.Y.

[73] Assignee: Eastman Kodak Company, Rochester, N.Y.

[21] Appl. No.: 431,182

[22] Filed: Apr. 28, 1995

[51] Int. Cl.$^6$ .................................................. G11B 15/60
[52] U.S. Cl. ........................................................ 360/130.32
[58] Field of Search ............................ 360/130.3–130.32

[56] References Cited

U.S. PATENT DOCUMENTS

| | | |
|---|---|---|
| 5,034,836 | 7/1991 | DeMarti, Jr. et al. . |
| 5,274,522 | 12/1993 | Taillie . |
| 5,285,324 | 2/1994 | Weigand et al. . |
| 5,285,325 | 2/1994 | Kiesow . |

*Primary Examiner*—A. J. Heinz
*Attorney, Agent, or Firm*—Cumpston & Shaw

[57] ABSTRACT

A magnetic head-to-media backer assembly for urging a magnetic media into contact with a magnetic head having, a magnetic head mounting backer plate with first and second locating pins and a plate mounting hole extending through the plate for accommodating a mounting screw, a magnetic head-to media backer device mounted on the backer plate having a frame with a cavity therein and a spring member partially contained within the cavity, said frame further comprising first and second locating holes extending there through for receiving the first and second locating pins and a frame mounting hole extending through the frame for accommodating the mounting screw there through, and an asymmetrically shaped film guide cover plate mounted over said backer device having a tapped hole there through for fastening with the mounting screw, whereby the cover plate is removably fastened to the backer plate and the backer device is captured between the backer and cover plates, is described.

13 Claims, 3 Drawing Sheets

MAGNETIC HEAD-TO-MEDIA BACKER ASSEMBLY

FIELD OF THE INVENTION

This invention relates to a magnetic media edge follower device and more particularly to a magnetic head-to-media backer assembly for reliable magnetic function and media handling.

BACKGROUND OF THE INVENTION

The basic function of a magnetic media follower device is to control the intimate contact between the magnetic head and the magnetic media, such as a photographic film or magnetic tape. To accomplish this there are two primary functional requirements. A load applying member, frequently in the form of a leaf or reed like spring, forces the media against the surface of the head for magnetic reading or writing. The second is the ability for the assembly to track the edge of the media by means of a follower unit so that variations in the cut quality of the media or inaccuracies due to splicing of media do not impact the positioning of the head relative to the edge of the media.

The load applying member may be in the form of a reed like backer or an arched spring which is held in a rigid frame with a cavity designed to hold the spring bent in an arc with opposite legs of the spring captured within the cavity, and the center portion of the spring protruding from an opening to the cavity and bearing on the magnetic media.

A consideration in designing magnetic follower devices for photo finishing equipment which are subject to extensive use and wear is that the component parts such as the arched spring and worn magnetic heads be replaceable without requiring full disassembly of the mechanical unit. In a two-head device it is desirable to have an inventory of critical parts that can be used on either side of the assembly and to minimize parts with left and right hand components U.S. Pat. No. 2,644,690 discloses a presser and tape guide assembly comprising a symmetrical presser shoe or head mounted on a non-symmetrical body that has differently shaped tape guide wings that engage the tape ahead of and beyond the magnetic head. There is no suggestion that the body is a cover plate or that this construction be used in a two-head device.

U.S. Pat. No. 5,034,836 discloses a magnetic head suspension apparatus for use with photographic film which includes a movable support mounted for movement through an arc having a predetermined radius and a pair of magnetic head suspension assemblies each rotatably mounted on the moveable support. The suspension assemblies are biased towards each other to cause surfaces of the magnetic head assemblies to engage opposite edges of a photographic film respectively. The entire assembly is formed of symmetrical components.

U.S. Pat. No. 5,274,522 discloses a magnetic head-to-media backer device comprising a member adapted to urge a flexible magnetic media into contact with a magnetic head. The rigid frame for holding the member has a cavity and various embodiments of the cavity are described.

U.S. Pat. No. 5,285,324 discloses a magnetic reading and/or recording apparatus which includes a plurality of magnetic reading and/or recording elements to read and/or record information from/on a flexible magnetic recording material, and a flexible plate. A means for arranging the elements and the flexible plate to contact the magnetic recording material with the elements is included, the arranging means includes a pressure pad mounting block having a recess to accept the flexible plate.

U.S. Pat. No. 5,285,325 discloses a two-headed magnetic recording or playback assembly for a camera that includes two symmetrical pressure pad mounting blocks.

It is an object of this invention to provide a magnetic head-to-media backer assembly in which the arched spring can be accurately positioned with respect to a magnetic head.

It is another object of this invention to provide a magnetic head-to-media backer assembly comprising primarily symmetrical components that are interchangeable between sides of a two headed apparatus and which is readily assembled and disassembled.

SUMMARY OF THE INVENTION

Briefly stated and in accordance with one aspect of the invention there is provided a magnetic head-to-media backer assembly for urging a magnetic media into contact with a magnetic head comprising, a magnetic head mounting backer plate having inner and outer sides, top and bottom latitudinal edges and longitudinal edges for mounting a magnetic head on the inner side thereof, the backer plate further comprising first and second locating pins mounted to the inner side adjacent to and in parallel with the top latitudinal edge and a plate mounting hole extending through the plate for accommodating a mounting screw, a magnetic head-to media backer device mounted on the backer plate comprising a frame having a cavity therein and a spring member partially contained within the cavity, said frame further comprising first and second locating holes extending there through for receiving the first and second locating pins and a frame mounting hole extending through the frame for accommodating the mounting screw there through, and an asymmetrically shaped film guide cover plate mounted over said backer device having a tapped hole there through for fastening with the mounting screw, whereby the cover plate is removably fastened to the backer plate and the backer device is captured between the backer and cover plates.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

This invention is disclosed for a magnetic head-to-media backer assembly which is incorporated in a magnetic media edge follower device. This description is directed in particular to those components forming part of or directly cooperating with the disclosed embodiment of the invention.

Figure 1:
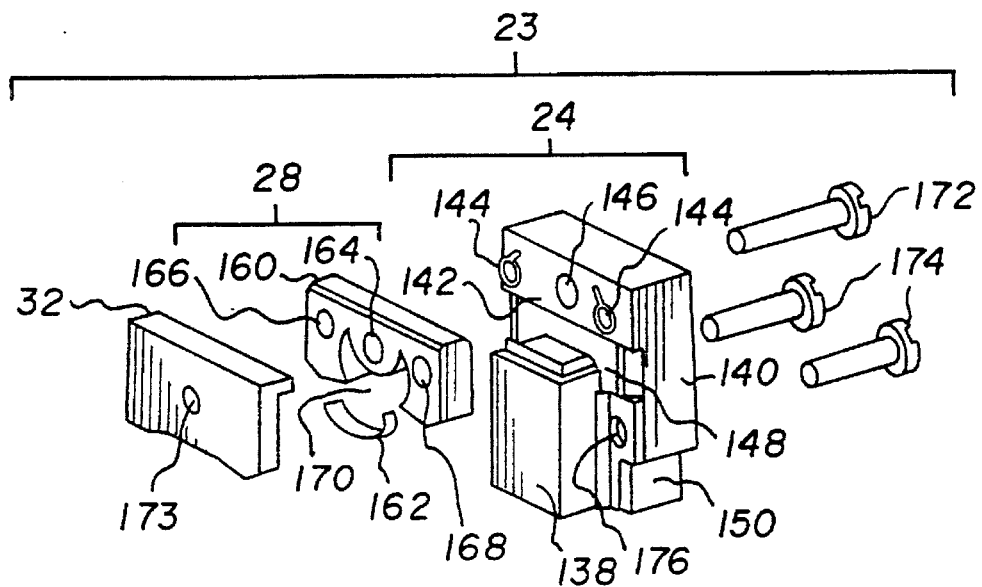
FIG. 1 is an exploded perspective view of a first magnetic head-to-media backer assembly.
Figure 2:
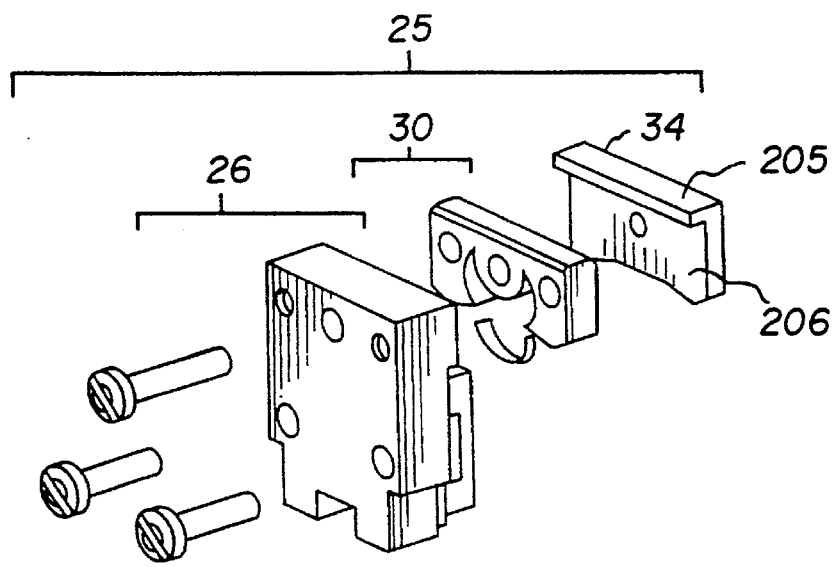
FIG. 2 is an exploded perspective view of a second magnetic head-to-media backer assembly.

Referring to the drawings and more specifically to FIGS. 1 and 2, there are disclosed embodiments of magnetic head-to-media backer assemblies 23, 25 of the invention. The magnetic head-to-media backer assemblies 23, 25 include head and backer sub-assemblies 24, 26, magnetic head-to-media backer devices 28, 30 (also called arched spring assemblies) and film guide cover plates 32, 34 respectively.

Figure 3:
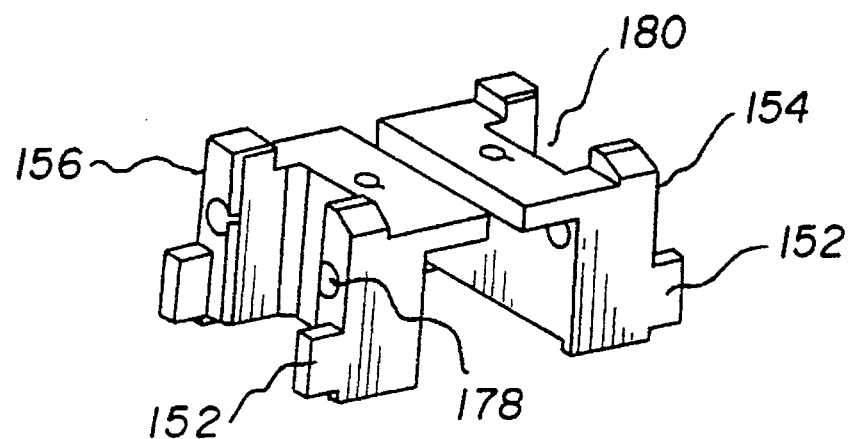
FIG. 3 is a perspective view of a magnetic head-to-media head block.

The head and backer sub-assemblies 24, 26 differ only in the nature of the head component. The head component may be a recording head, a reading head or an inactive head depending on the purpose of the equipment on which the assembly is mounted. The head and backer sub-assembly 24 will be described for any magnetic head component. A magnetic head 138 is adhesively attached to a backer plate 140 along with a ceramic edge guide 148. Each backer plate preferably has a symmetrical configuration. The backer plate is, preferably, generally rectangular shaped with inner and outer sides and longitudinal and latitudinal edges. The inner side 142 has a pair of dowel locating pins 144 mounted, for example press mounted, in recesses formed in the side adjacent to the upper latitudinal edge and positioned, for example, on either side of a mounting hole 146 extending through the thickness of the plate. The pins are precisely positioned so that the magnetic head-to-media backer device can be accurately placed with respect to a magnetic head. A rectangular recess is formed in the inner face parallel to the top latitudinal edge and below the locating pins for receiving the edge guide 148 which is adhesively mounted in the recess. The surface of the edge guide is ground flush with the surface of the backer plate. Referring also to FIG. 3, the longitudinal edges of the backer plate have L-shaped notches 150 formed to accommodate the tabs 152 of corresponding head block 154 during final assembly. The magnetic head 138 is mounted on the inner face of the backer either by adhesive or with a fastener so that the bottom end of the head is flush with the bottom latitudinal edge of the backer and the head-to-media end of the head overlaps a portion of the edge guide 148 and is centered on the edge guide.

The magnetic head-to-media backer devices 28, 30 are preferably in the form of identical arched spring assemblies. Each arched spring assembly includes a frame 160 and an arched spring 162. The frame is preferably constructed of rigid materials, for example, metal or plastic, more preferably metal. Each frame has a mounting hole 164, a first locating hole 166, a second locating hole 168, and a cavity 170 for holding the arched spring. Each frame preferably has a symmetrical configuration with the mounting hole located centrally between the locating hoes. The arched spring assembly is positioned over the locating pins 144 above the magnetic head and is captured between the inner side 142 of the backer and the film guide cover plate 32 (or 34) by tightening a threaded screw 172, inserted through the mounting holes 146 and 164, to a tapped mounting hole 173 of the film guide cover plate 32 (or 34). The magnetic head-to-media backer assemblies 23, 25 are mounted on head blocks 154, 156 by screws 174 inserted through mounting holes 176 into tapped holes 178 of the head blocks.

A critical parameter for head to media contact is the positional control of the arched spring (and its rigid frame holder) relative to the gap of the magnetic head. The disclosed backer plate 140 utilizes two round locating pins 144 for engaging corresponding locating holes 166, 168 in the frame 160 of the arched spring assembly. In a preferred embodiment one of the locating holes is a round hole and the other is a generally round shaped slot. The width of the obround shaped slot is the same diameter as the round hole diameter while the length of the obround hole is slightly greater than the diameter to allow for slight variations in the spacing between the locating pins. This hole pattern allows for very accurate and repeatable positioning of the arched spring relative to the magnetic head.

An important consideration for magnetic head-to-media interface equipment is the ability to replace damaged arched springs and worn magnetic heads without requiring full disassembly of the mechanical unit. If replacement of the arched spring is required, the entire arched spring assembly is removed after screw 172 is withdrawn and film guide cover 32 (or 34) is removed. A new arched spring assembly is then positioned on the pins and the cover and screw are reassembled. If a magnetic head-to media backer assembly 23 needs replacement, the head and backer assembly 24 can be removed from the head block 154 by removing the two remaining screws 174. The film guide cover, arched spring assembly and head and backer assembly can be removed and replaced with a new assembly. This approach allows for the replacement of a single assembled unit that contains all the critical alignments and positioning of the magnetic head relative to the arched spring. In addition this replacement scheme requires no further disassembly of the critical moving elements or critical interfaces that are part of the larger assembly.

For both the head and backer assembly and the arched spring rigid frame, the design allows for assembly on either side of the follower unit, i.e. left or fight. This offers a significant advantage to a photo finisher since it is only required to inventory a single version of each replacement part.

An important aspect of the invention is the fact that the film guide cover plates 32, 34 are configured as mirror images, i.e. there is a right-handed and left-handed configuration for the part as viewed by an observer, and the part is specifically designed for one side of the assembly only. Thus two different versions am required in inventory.

Figure 4:
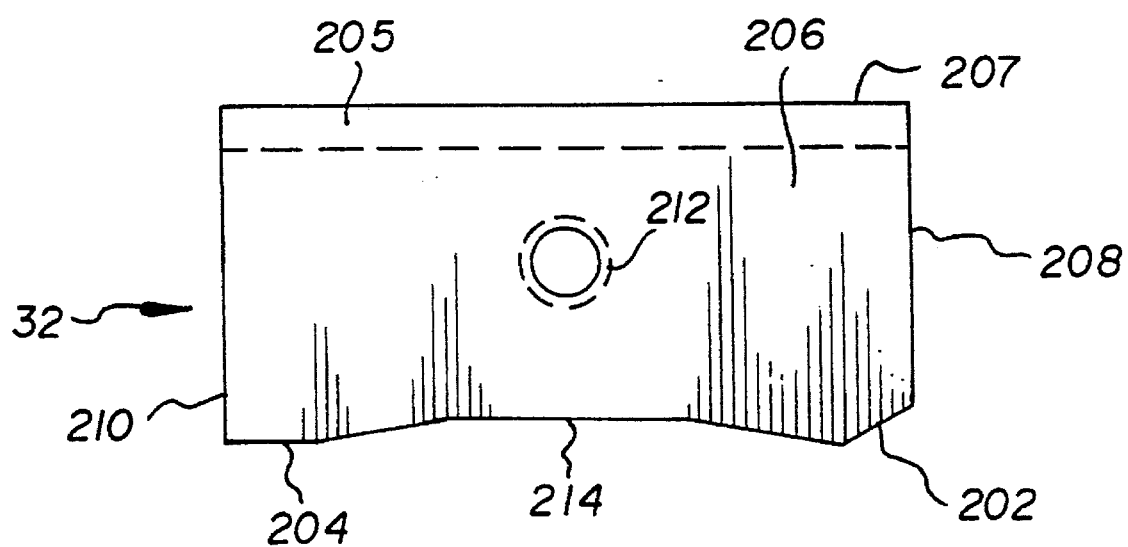
FIG. 4 is a perspective front view of a film guide cover plate.

Referring to FIG. 4 the film guide cover plate 32 (or 34) has a media lead-in shaped end 202 on the upstream side for easy media insertion and a media hand-off shaped end 204 on the downstream side for hand-off to the remainder of the transport track. The cover has an L-shaped end profile (FIGS. 1 and 2) with a rectangular shaped short leg of the L-section 205 extending out at fight angles from the top edge of the generally rectangular shaped long leg 206 towards the head backer assembly over the head-to-media backer device. The long leg has a straight top longitudinal edge 207, straight latitudinal edges 208, 210 and a second, asymmetric, convoluted, bottom longitudinal edge 214. The long leg has a tapped hole 212 located midway between the latitudinal edges and spaced from the top edge to receive a mounting screw passed through the upper end of the head backer assembly The bottom longitudinal edge of the long leg has a generally convex central portion 214 between lead-in and hand-off end portions to accommodate the magnetic media as it travels over the concave shaped magnetic head. The corner of the lead-in portion is cut at an acute angle, preferably about 30°, with the latitudinal edge to enable insertion of the magnetic media. The hand-off portion is parallel to the top edge and has a beveled corner. The central portion can be formed with straight edges and angled corners or as a continuous curved section.

Figure 5:
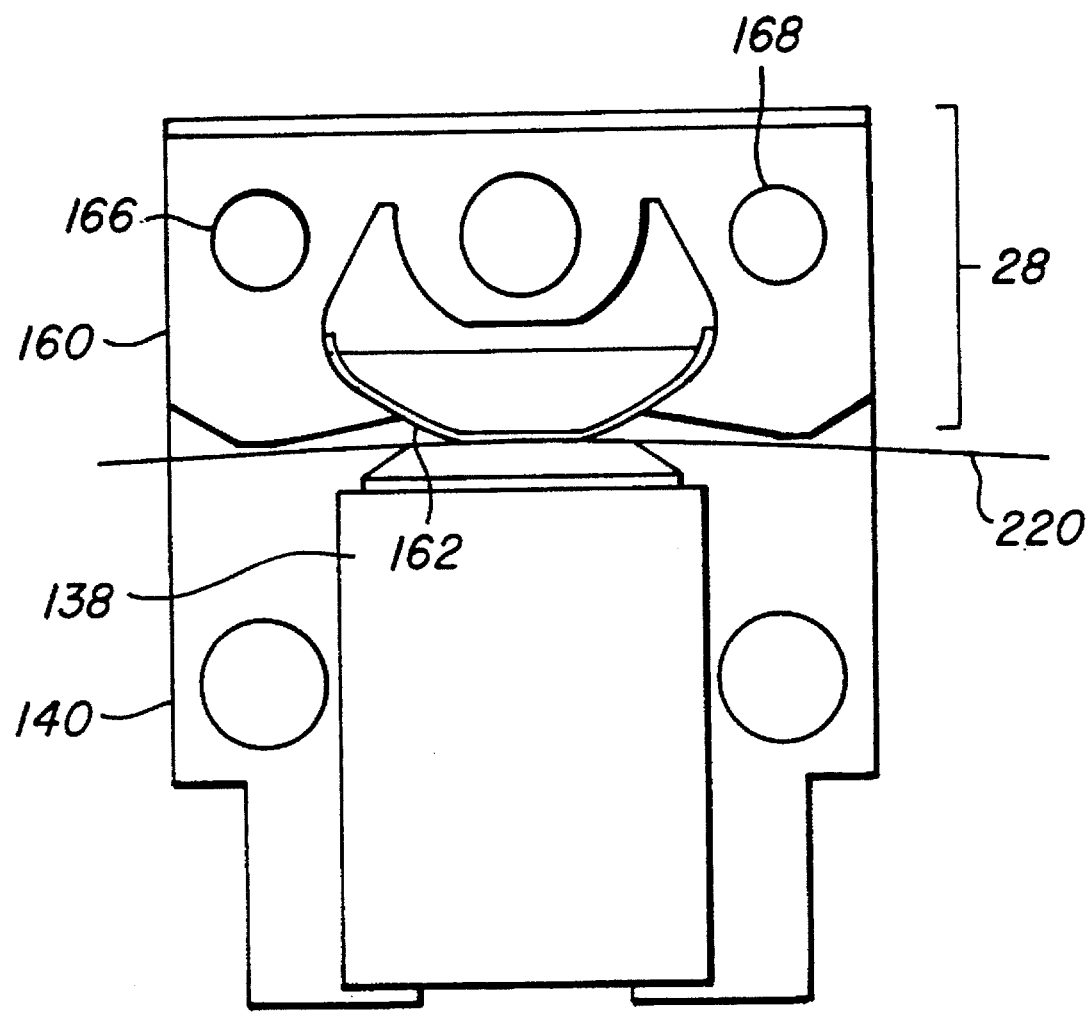
FIG. 5 is a partial sectional of the magnetic head-to-media backer assembly of FIG. 1.

Referring to FIG. 5 there is shown a partial sectional of the magnetic head-to-media backer assembly 23 of FIG. 1 showing the relationship between the backer device 28, the magnetic head 138 and the magnetic media 220. The magnetic head is mounted on the backer plate 140. The rigid frame 160 is positioned on the backer plate 140 by first and second locating holes 166, 168. The arched spring 162, held by the rigid frame 160, presses the magnetic media 220 against the magnetic head 138 as the magnetic media 220 travels over the magnetic head 138.

Referring again to FIG. 1, the plate 32 with the short leg on top extending to the fight towards the backer plate and the lead-in end towards the front is defined as having a fight-handed configuration. Referring again to FIG. 2, the plate 34 with the short leg on top extending to the left towards the backer plate and the lead-in end towards the front is defined as having a left-handed configuration.

Functionally it is desirable to have a wider lead in configuration on the side of the magnetic head-to-media backer assembly that accepts the threaded media and a more controlled exit for hand-off of the media to the next section of the media track. Although it is desirable to have parts which can be used on either side of the assembly this invention provides an inexpensive cover plate which is asymmetric and specifically used for one side of the assembly thus achieving the desired function with minimal additional expense as a consequence of having two different components in inventory.

A complete magnetic head-to-media backer assembly is assembled in the same manner for both left and right sides of the magnetic media path for as follows.

The magnetic head backer is placed in a holder with the media edge guide slot facing up and adhesive is added to the sides and bottom of the slot. The media edge guide is placed in the slot with the beveled side facing up. After curing the top surface of the guide is finish ground to ensure the media edge guide and the head mounting surface are coplanar and sharp edges are removed by stoning. The dowel locating pins are pressed into the holes of the head backer so that the pins are at the set height of the edge guide surface. The above assembly is placed in a holding clamp and the magnetic head is placed on the backer with the top slightly overlapping the edge guide and centered relative to the dowel locating pins. In one embodiment of the assembly screws are used to fasten the head to the backer and penetrating adhesive is then applied along the edges of the magnetic head. In another embodiment the head is adhesively attached to the backer.

The magnetic head assembly, for example 24, is positioned onto a head block 154 so that the head is nested into the head cavity 180 on the block (FIG. 3) and positioning tabs 152 on the block fit into the notches 150 on the head assembly. Two screws 174 fasten the head backer to the tapped holes 178 in the head block. Keeping the frame cavity centered on the head backer the frame 160 and arched spring 162 are slid onto the dowel locating pins 144 of the backer plate 140 and held there by the force of the arched spring against the top surface of the magnetic head. A film guide cover plate of the correct configuration 32 (i.e. right-handed) with the short leg of the L-section covering the frame is placed over the magnetic head-to-media backer device and fastened to the head backer plate with the screw 172. The sequence is repeated for the other half of the assembly.

This invention provides a magnetic head-to-media backer assembly which is readily assembled and disassembled from a magnetic media follower device. Provision is made for accurately positioning the arched spring with respect to a magnetic head by means of precisely located dowel pins on the head backer. The backer assembly is composed primarily of symmetrical parts which are interchangeable for use in left or right hand components of a two head device. The use of an inexpensive asymmetric film guide cover plate maintains functional usefulness with minimal consequences on the inventory of parts.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

Parts List

23 ... backer assembly
24 ... head and backer assembly
25 ... backer assembly
28 ... arched spring assembly
30 ... arched spring assembly
32 ... film guide cover plate
34 ... film guide cover plate
138 ... magnetic head
140 ... backer plate
142 ... backer plate innerside
144 ... locating pins
146 ... mounting hole
148 ... edge guide
150 ... L-shaped notches
152 ... head block tabs
154 ... head block
156 ... head block
160 ... rigid frame
162 ... arched spring
164 ... mounting hole
166 ... first locating hole
168 ... second locating hole
170 ... frame cavity
172 ... screw
173 ... tapped mounting hole
174 ... screws
176 ... mounting holes
178 ... tapped holes
180 ... head block cavity
202 ... lead-in end
204 ... hand-off end
205 ... short leg
206 ... long leg
207 ... long leg top edge
208 ... latitudinal edge
210 ... latitudinal edge
212 ... tapped hole
214 ... convex central portion

What is claimed is:

1. A magnetic head-to-media backer assembly for urging a magnetic media into contact with a magnetic head comprising;

a magnetic head mounting backer plate having inner and outer sides, top and bottom latitudinal edges and longitudinal edges for mounting a magnetic head on the inner side thereof, the backer plate further comprising first and second locating pins mounted to the inner side adjacent to and in parallel with the top latitudinal edge and a plate mounting hole extending through the plate for accommodating a mounting screw;

a magnetic head-to media backer device mounted on the backer plate comprising a frame having a cavity therein and a spring member partially contained within the cavity, said frame further comprising first and second locating holes extending there through for receiving the first and second locating pins and a frame mounting hole extending through the frame for accommodating the mounting screw there through; and an asymmetrically shaped film guide cover plate mounted over said backer device having a tapped hole therethrough for fastening with the mounting screw;

whereby the cover plate is removably fastened to the backer plate and the backer device is captured between the backer plate and the cover plate.

2. The assembly according to claim 1, in which the cover plate has an L-shaped end profile in which the short leg of the plate is a rectangular section and the long leg of the plate is a generally rectangular section, the generally rectangular long leg section has first and second straight latitudinal edges, a first straight longitudinal edge adjoining the short rectangular section and a second asymmetric convoluted longitudinal edge for guiding the magnetic media over the magnetic head.

3. The assembly according to claim 2, in which the asymmetric convoluted longitudinal edge has, a first end portion angled acutely upwards to the first latitudinal edge for leading in the magnetic media, a second end portion at right angles to the second latitudinal edge for handing off the magnetic media, and a generally convex shaped central portion connecting the first and second end portions.

4. The assembly according to claim 3, in which the cover plate has a right-handed configuration.

5. The assembly according to claim 3, in which the cover plate has a left-handed configuration.

6. The assembly according to claim 1, in which the backer plate has a symmetrical configuration.

7. The assembly according to claim 1, in which the frame has a symmetrical configuration.

8. The assembly according to claim 1, in which one of the first and second locating holes is round and the other is a generally obround shaped slot.

9. The assembly according to claim 1, in which the backer plate further comprises a recess formed in the inner face and an edge guide mounted therein.

10. The assembly according to claim 1, in which the plate mounting hole is located between the first and second locating pins.

11. The assembly according to claim 1, in which the frame mounting hole is located between the first and second locating holes.

12. The assembly according to claim 1, further comprising a head block removably attached to the backer plate, the head block having a positioning tab for aligning with the backer plate and a tapped hole for receiving a removable fastener therein.

13. The assembly according to claim 12, in which the backer plate longitudinal edge has a notch to accommodate the positioning tab therein.

\* \* \* \* \*